United States Patent [19]

Ushiku

[11] Patent Number: 6,146,026
[45] Date of Patent: Nov. 14, 2000

[54] SYSTEM AND APPARATUS FOR SELECTIVELY PUBLISHING ELECTRONIC-MAIL

[75] Inventor: Toyohiko Ushiku, Fujisawa, Japan

[73] Assignee: Canon Kabushiki Kaisha, Tokyo, Japan

[21] Appl. No.: 08/982,923

[22] Filed: Dec. 2, 1997

[30] Foreign Application Priority Data

Dec. 27, 1996 [JP] Japan ................................ 8-350207

[51] Int. Cl.[7] .................................................. G06F 15/173
[52] U.S. Cl. ........................... 395/200.37; 395/200.33; 395/200.36; 395/200.49; 707/6; 707/10; 707/104
[58] Field of Search ................... 707/10, 201, 5; 395/200.36, 200.37, 200.33, 200.49

[56] References Cited

U.S. PATENT DOCUMENTS

| | | | |
|---|---|---|---|
| 5,613,108 | 3/1997 | Morikawa | 707/201 |
| 5,619,648 | 4/1997 | Canale et al. | 395/200.01 |
| 5,634,005 | 5/1997 | Matsuo | 395/200.02 |
| 5,764,898 | 6/1998 | Tsuji et al. | 395/200.36 |
| 5,765,033 | 6/1998 | Miloslavsky et al. | 395/200.36 |
| 5,826,269 | 10/1998 | Hussey | 707/10 |
| 5,832,218 | 11/1998 | Gibbs et al. | 395/200.33 |

OTHER PUBLICATIONS

Avery, et al., "Recommender systems for evaluating computer messages" Communications of the ACM, vol. 40, No. 3, Abstract Only Mar. 1997.

Krulwich et al., "The ContactFinder agent: answering bulletin board questions with referrals", vol. 1,Abstract Only, Aug. 1996.

Primary Examiner—Jean R. Homere
Attorney, Agent, or Firm—Fitzpatrick, Cella, Harper & Scinto

[57] ABSTRACT

A user A sends electronic mail addressed to a user B. A mail server then receives the electronic mail sent from the user A and sends it to a publishing server. Upon receiving the electronic mail, the publishing server extracts a specific type of electronic mail from the received electronic mail based on a filtering condition and publishes the extracted electronic mail. Then, the publishing server returns to the mail server the electronic mail which has not been extracted. The users C and D are thus able to read the published electronic mail by accessing the publishing server. It is therefore possible to publish the mail without needing to perform a complicated operation, thereby reducing effort.

39 Claims, 14 Drawing Sheets

| RECEIVER | B |
|---|---|
| SENDER | A |
| SUBJECT | WORD "NOTICE" INCLUDED |
| PUBLISHED PAGE | /NOTICE/A.html |

FIG. 7A

```
<HTML>
<HEAD><TITLE>MAIL LIST</TITLE></HEAD>
<BODY>
<TABLE>
<TR><TD>SUBJECT</TD><TD>SENDER</TD><TD>DATE</TD></TR>
<%beginloop%>
<TR>
<TD><A HREF=<%messagepage%>><%subject%></A></TD>
<TD><%sender%></TD>
<TD><%date%></TD>
</TR>
<%endloop%>
</TABLE>
</BODY>
</HTML>
```

```
<HTML>
<HEAD><TITLE>MAIL LIST</TITLE></HEAD>
<BODY>
<TABLE>
<TR><TD>SUBJECT</TD><TD>SENDER</TD><TD>DATE</TD></TR>
<TR>
<TD><A HREF="http://mail/NOTICE/00001.html">PERSONNEL REORGANIZATION IN SEPTEMBER</A></TD>
<TD>PERSONNEL SECTION, GENERAL AFFAIRS DEPARTMENT</TD>
<TD>9/1   15:40</TD>
</TR>
<TR>
<TD><A HREF="http://mail/NOTICE/00002.html">HOME-PURCHASE SAVINGS </A></TD>
<TD>WELFARE SECTION, GENERAL AFFAIRS DEPARTMENT</TD>
<TD>9/8   9:34</TD>
</TR>
<TR>
<TD><A HREF="http://mail/NOTICE/00003.html">NOTICE : CHANGE IN PURCHASING SLIP</A></TD>
<TD>MATERIALS SECTION, MATERIALS DEPARTMENT</TD>
<TD>9/10   10:01</TD>
</TR>
<TR>
<TD><A HREF="http://mail/NOTICE/00004.html">NOTICE : HEALTH CHECKUP</A></TD>
<TD>CLINIC</TD>
<TD>9/15   16:43</TD>
</TR>
</TABLE>
</BODY>
</HTML>
```

| SUBJECT | SENDER | DATE |
|---|---|---|
| PERSONNEL REORGANIZATION IN SEPTEMBER | PERSONNEL SECTION, GENERAL AFFAIRS DEPARTMENT | 9/1 15:40 |
| HOME-PURCHASE SAVINGS | WELFARE SECTION, GENERAL AFFAIRS DEPARTMENT | 9/8 9:34 |
| NOTICE : CHANGE IN PURCHASING SLIP | MATERIALS SECTION, MATERIALS DEPARTMENT | 9/10 10:01 |
| NOTICE : HEALTH CHECKUP | CLINIC | 9/15 16:43 |

```
<HTML>
<HEAD>
<TITLE><%subject%></TITLE>
</HEAD>
<BODY>                              ─ 860
<B>SUBJECT : </B><%subject%>  ─ 840
<P><B>SENDER : </B><%sender%>
<P><B>DATE : </B><%date%>
                                    ─ 850
<P><B>          </B>
<P><%body%>        ─ 870
</BODY>
</HTML>
```
─ 810

FIG. 8B

```
<HTML>
<HEAD>
<TITLE>Test </TITLE>
</HEAD>
<BODY>
<B>SUBJECT : </B>PERSONNEL REORGANIZATION IN SEPTEMBER
<P><B>SENDER : </B>PERSONNEL SECTION, GENERAL AFFAIRS DEPARTMENT
<P><B>DATE : </B>9/1  15 : 14
<P><B>SUBJECT : </B>
<P>THE REORGANIZATION PERSONNEL IN SEPTEMBER IS AS FOLLOWS.
<P>
 . . . . . . . . . . . . . . . .
</BODY>
</HTML>
```
─ 820

FIG. 8C

```
SUBJECT : PERSONNEL REORGANIZATION IN SEPTEMBER
SENDER : PERSONNEL SECTION, GENERAL AFFAIRS DEPARTMENT
DATE : 9/1  15 : 14
SUBJECT : THE REORGANIZATION PERSONNEL IN SEPTEMBER IS AS FOLLOWS.

FILTER = EXPRESSION "to" STORAGE-AREA "with" PUBLISHING-FORMAT-NAME

EXPRESSION = OR-OPERATION-EXPRESSION / NOT-OPERATION-EXPRESSION

OR-OPERATION-EXPRESSION = AND-OPERATION-EXPRESSION / OR-OPERATION-EXPRESSION "or" AND-OPERATION-EXPRESSION

AND-OPERATION-EXPRESSION = RELATIONAL-OPERATION-EXPRESSION / AND-OPERATION EXPRESSION "and" RELATIONAL-OPERATION-EXPRESSION RELATIONAL-OPERATION-EXPRESSION = NOT-OPERATION-EXPRESSION / RELATIONAL-OPERATION-EXPRESSION    RELATIONAL-OPERATOR    SIMPLE-EXPRESSION RELATIONAL-OPERATOR = "contain" / "equal" / "greater" / "less"

NOT-OPERATION-EXPRESSION = "not" EXPRESSION

SIMPLE-EXPRESSION = RESERVED-FIELD-NAME / WORD / "(" expression ")"

RESERVED-FIELD-NAME = "date" / "body" / "sender" / "receiver" / "subject"

WORD = '"""' 1*word '"""'

STORAGE-AREA = WORD

PUBLISHING-FORMAT-NAME = WORD

FIG. 12

(sender equal "A" or sender contain "GENERAL AFFAIRS") and subject contain "NOTICE" and not (body contain "INTERNALLY CONFIDENTIAL") to "NOTICE" with "NOTICE FORMAT"

SYSTEM AND APPARATUS FOR SELECTIVELY PUBLISHING ELECTRONIC-MAIL

BACKGROUND OF THE INVENTION

1. Field of the Invention

The present invention relates to an electronic-mail processing apparatus and an electronic-mail processing system, both of which are used for publishing electronic mail which satisfies specific conditions.

2. Related Background Art

Along with the trend of the paperless office, instead of using paper, electronic mail is increasingly being employed in companies to send communication notices from senior executives to middle managers. Previously, the middle managers generally received such notices and transferred them to their subordinates by electronic mail.

In this method, however, each subordinate has a copy of the same notice in his/her terminal, thereby wasting the storage capacity of the terminal. Moreover, since data concerning such notices is managed by the individuals, accidental operations, such as deleting the data, are likely to occur.

By virtue of the recent advent of publishing servers, if the managers register data sent from the senior executives in a publishing server, their subordinates are able to read data, thereby preventing the data from being doubly managed by the managers and their subordinates.

Even in this method, however, it is required that the managers first identify electronic mail as communication notices and then edit it into the form of publishable pages before registering it in the publishing server. This is time-consuming and troublesome.

To further solve the above problem, electronic-mail transmitting/receiving applications may be used. Some transmitting/receiving applications have a filtering capability in which, certain conditions, which are referred to as "the filtering conditions", are set to determine whether received electronic mail satisfies the set conditions, and upon determination, mail items are distributed and stored in specific mail boxes. By the use of the above capability, the managers start the electronic-mail transmitting/receiving application to create a mail box specifically used for communication notices, thereby making it possible to automatically collect only notice mail in the mail box. Then, the managers upload the contents of the mail box to the publishing server.

In the above known method, however, in order to reflect newly sent notices in the publishing server, the contents of the notice mail box should be updated by starting the electronic-mail transmitting/receiving application to obtain mail items from a mail server and distributing them into the respective mail boxes. It is also necessary to upload to the publishing server that the contents of the notice mail box have been updated and to update the contents of a mailbox published page on the publishing server. Thus, in the foregoing known methods, the operation procedure for publishing the notices is too complicated.

SUMMARY OF THE INVENTION

Accordingly, in view of the above background, it is an object of the present invention to publish a certain type of mail without needing to perform a complicated operation.

In order to achieve the above object, according to one aspect of the present invention, there is provided an electronic-mail processing apparatus comprising: receiving means for receiving electronic mail from a mail server which sends and receives electronic mail; condition setting means for setting a condition used for extracting a specific type of electronic mail; extracting means for extracting a specific type of mail from among the electronic mail received by the receiving means based on the condition set by the condition setting means; and publishing means for publishing the specific type of electronic mail extracted by the extracting means in a publishing area.

According to another aspect of the present invention, there is provided an electronic-mail processing system comprising a first terminal, a second terminal, a first server, and a second server, wherein the first terminal sends electronic mail addressed to terminals other than the first terminal, the first server receives the electronic mail sent from the first terminal, the second server receives the electronic mail from the first server to extract a specific type of electronic mail from the received electronic mail based on a condition for extracting the specific type of electronic mail and publishes the extracted electronic mail in a publishing area, and the second terminal accesses the second server to receive information of the electronic mail published in the publishing area.

Further objects, features and advantages of the present invention will become apparent from the following description of the preferred embodiments with reference to the attached drawings.

BRIEF DESCRIPTION OF THE DRAWINGS

FIG. 7, which is comprised of FIGS. 7A through 7C, illustrates a skeleton used for creating a list page according to the first embodiment of the present invention;

FIG. 8, which is comprised of FIGS. 8A through 8C, illustrates a skeleton used for creating a mail information page according to the first embodiment of the present invention;

FIG. 11 illustrates the description of the language specifications for describing filtering conditions used in a third embodiment of the present invention;

FIG. 12 illustrates an example of the filtering conditions used in the third embodiment.

DESCRIPTION OF THE PREFERRED EMBODIMENTS

A first embodiment of the present invention will now be explained.

Figure 1:
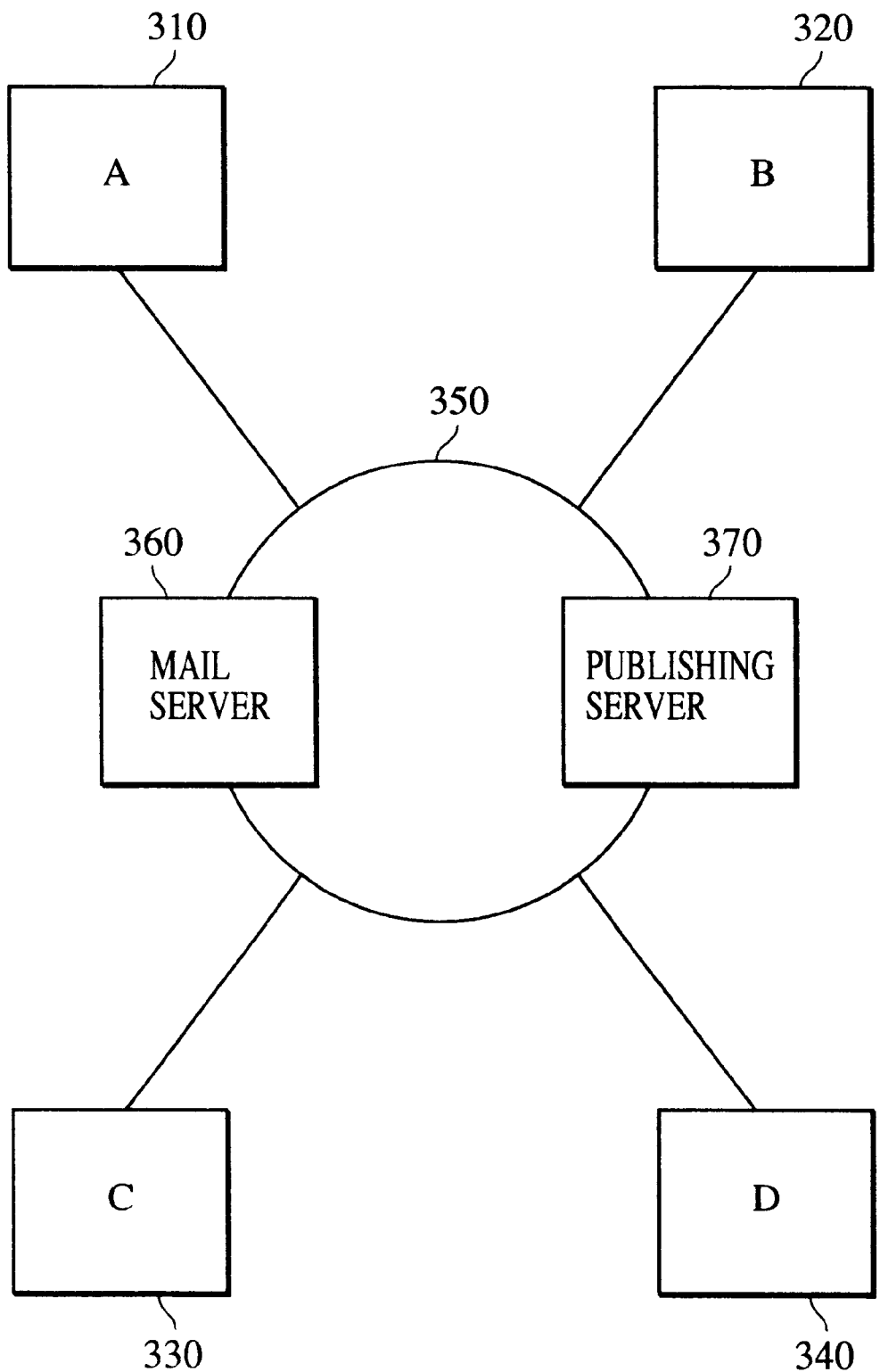
FIG. 1 is a block diagram illustrating a network according to a first embodiment of the present invention.

FIG. 1 is a diagram illustrating a network structure according to the first embodiment. A terminal A 310, a terminal B 320, a terminal C 330, and a terminal D 340 respectively owned by users A, B, C and D are connected via a network 350 to a mail server 360 for distributing mail to the terminals A, B, C and D. The terminals 310 through 340 are also connected to a publishing server 370 for publishing mail.

Figure 2:
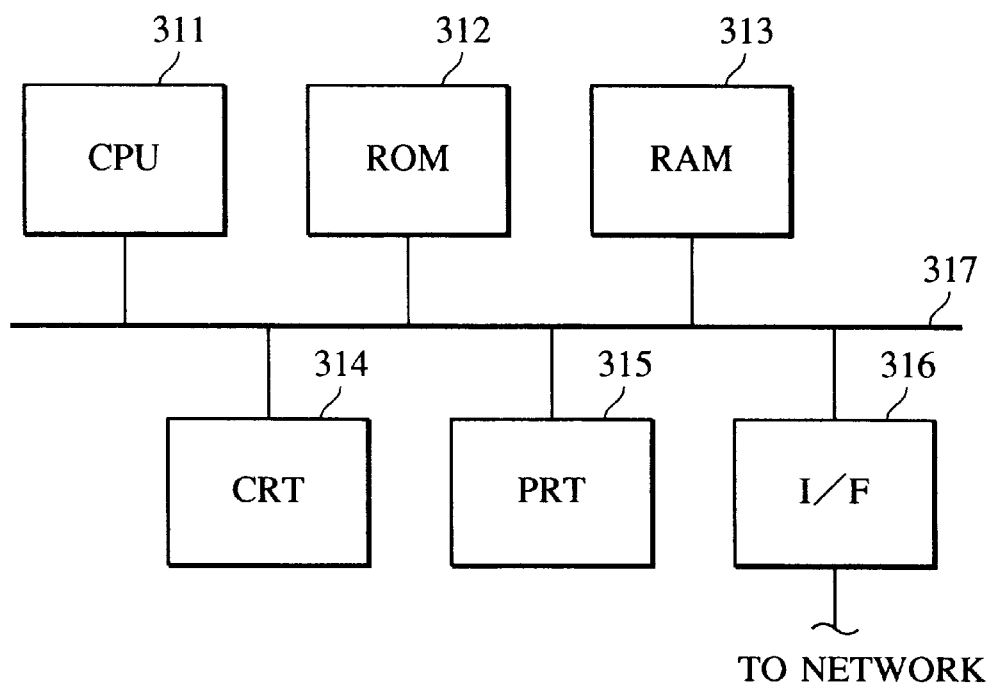
FIG. 2 is a block diagram illustrating the hardware configuration used in each terminal of the network.

FIG. 2 illustrates the hardware configuration of each terminal shown in FIG. 1. A CPU 311 controls the overall terminal. A ROM 312 stores various application programs. A RAM 313 is used as a work area of the CPU 311. A CRT display 314 displays the contents processed by the CPU 311. A printer 315 prints the results processed by the CPU 311. An interface 316 serves as a connecting portion through which each terminal can be connected to the network 350. The hardware configuration of the mail server 360 and the publishing server 370 is substantially similar to the above-described configuration of each terminal.

Figure 3:
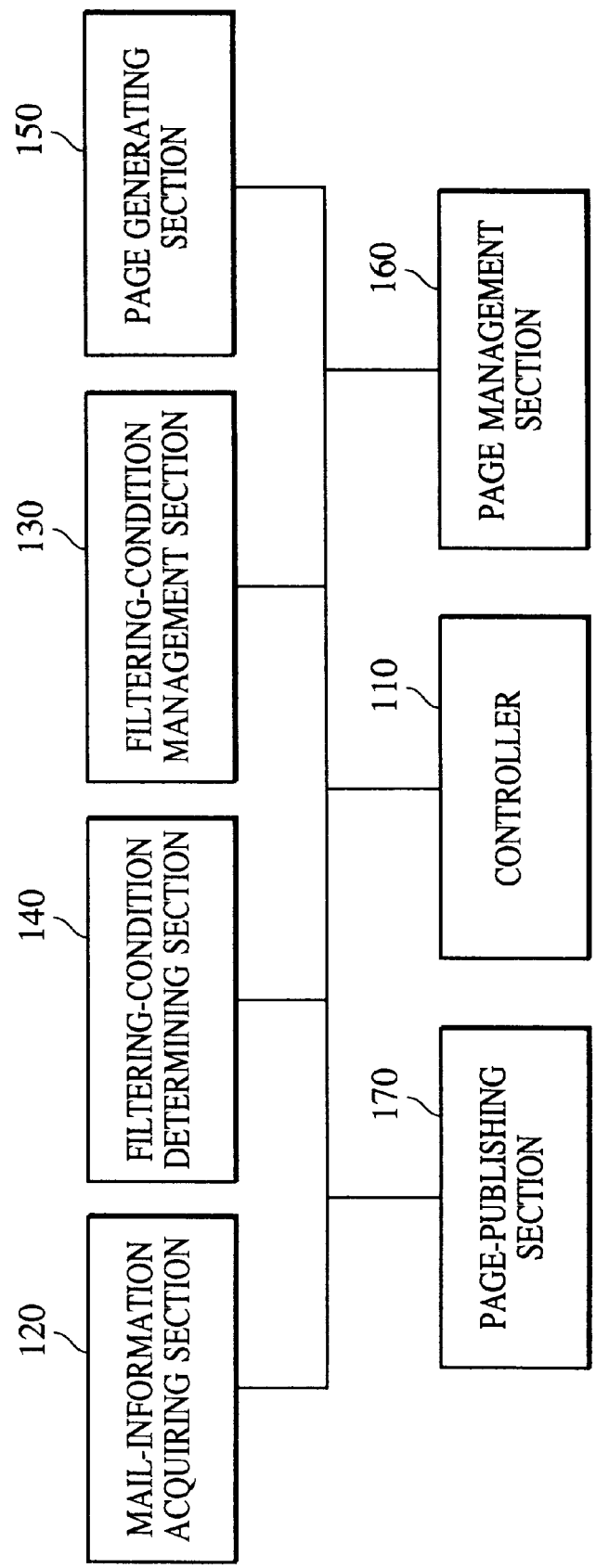
FIG. 3 is a block diagram illustrating the functions of an electronic-mail processing program according to the first embodiment.

FIG. 3 is a block diagram illustrating the functions of an electronic-mail processing program, which is stored in the ROM of the publishing server 370 shown in FIG. 1, according to the first embodiment of the present invention. The electronic-mail processing program has a controller 110 which controls the overall program. A mail-information acquiring section 120 acquires mail information from the mail server 360. A filtering-condition management section 130 manages the conditions for filtering mail. A filtering-condition determining section 140 determines whether the mail information acquired by the main-information acquiring section 120 satisfies the conditions managed by the filtering-condition management section 130. A page generating section 150 converts the mail information which has been determined to satisfy the conditions by the filtering-condition determining section 140 into the form of a published page. A page management section 160 manages the page created by the page generating section 150. A page publishing section 170 publishes the page managed by the page management section 160 in response to a client application.

Figures 4, 5:
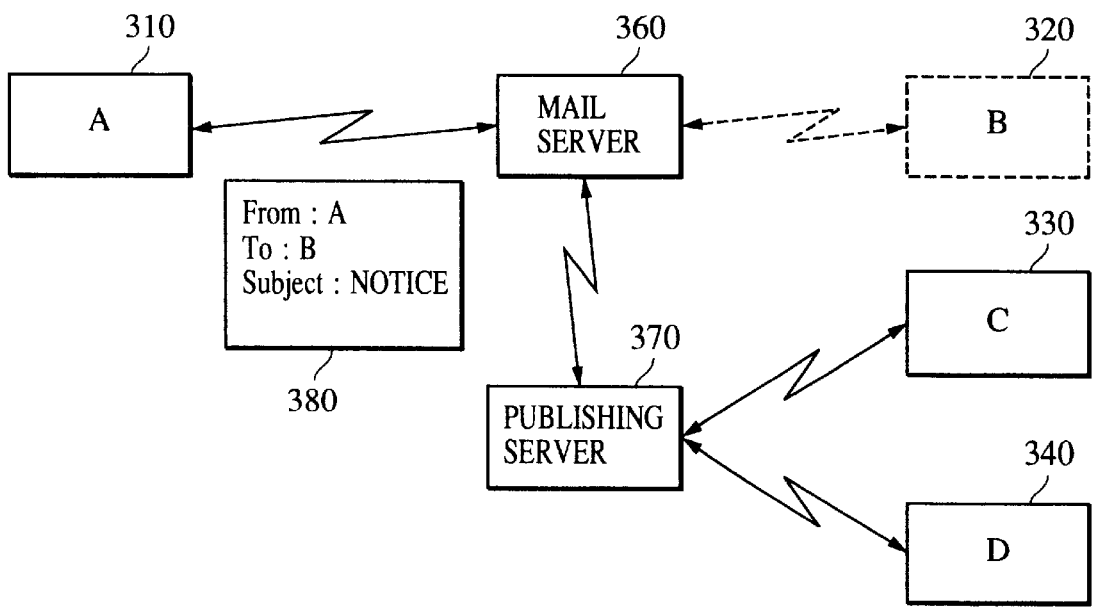
FIG. 4 illustrates an example of filtering conditions.
FIG. 5 illustrates relationships between the devices according to the first embodiment of the present invention.

FIG. 4 illustrates an example of the above-described filtering conditions. The conditions specified by this example are that the sender is A, the receiver is B, and the subject described in the subject field of the electronic mail includes the word "notice". The filtering conditions are set by designating a file in which the filtering conditions are described in the filtering-condition management section 130. The filtering conditions in the file are described by the user A or the user B. An explanation will now be given with reference to FIGS. 5 and 6 of the operation performed when the electronic mail including the subject which satisfies the above conditions is sent from the user A to the user B.

FIG. 5 illustrates the path in which the mail sent from the user A to the user B is published to other users C and D. In FIG. 5, an electronic-mail transmitting/receiving application is stored in a ROM of each of the terminal A 310 and the terminal B 320. A published-page reading application is stored in a ROM of each of the terminal C 330 and the terminal D 340. Reference numeral 380 represents mail information sent from the user A (the terminal A 310).

The user A creates the mail information 380 addressed to the user B by using the electronic-mail transmitting/receiving application and sends it to the mail server 360. Normally, the user B acquires the mail information 380 from the mail server 360 by using its electronic-mail transmitting/receiving application.

In this embodiment, however, the publishing server 370 rather than the user B acquires the mail information 380 from the mail server 360, and if the sender is A and if the word "notice" is included in the subject field, the publishing server 370 publishes the mail information 380. Thus, the users C and D are able to obtain the mail information 380 from the publishing server 370 by using their published-page reading application (which is referred to as a "WWW browser"). Needless to say, the user B is also able to obtain the mail information 380 from the publishing server 370. If the sender of the electronic mail is not the user A, or if the word "notice" is not contained in the subject field, the electronic mail is sent back to the mail server 360 from the publishing server 370.

The processing procedure in which the publishing server 370 obtains the mail information 380 from the mail server 360 and publishes the information will now be explained with reference to the flow chart of FIG. 6.

Figure 6:
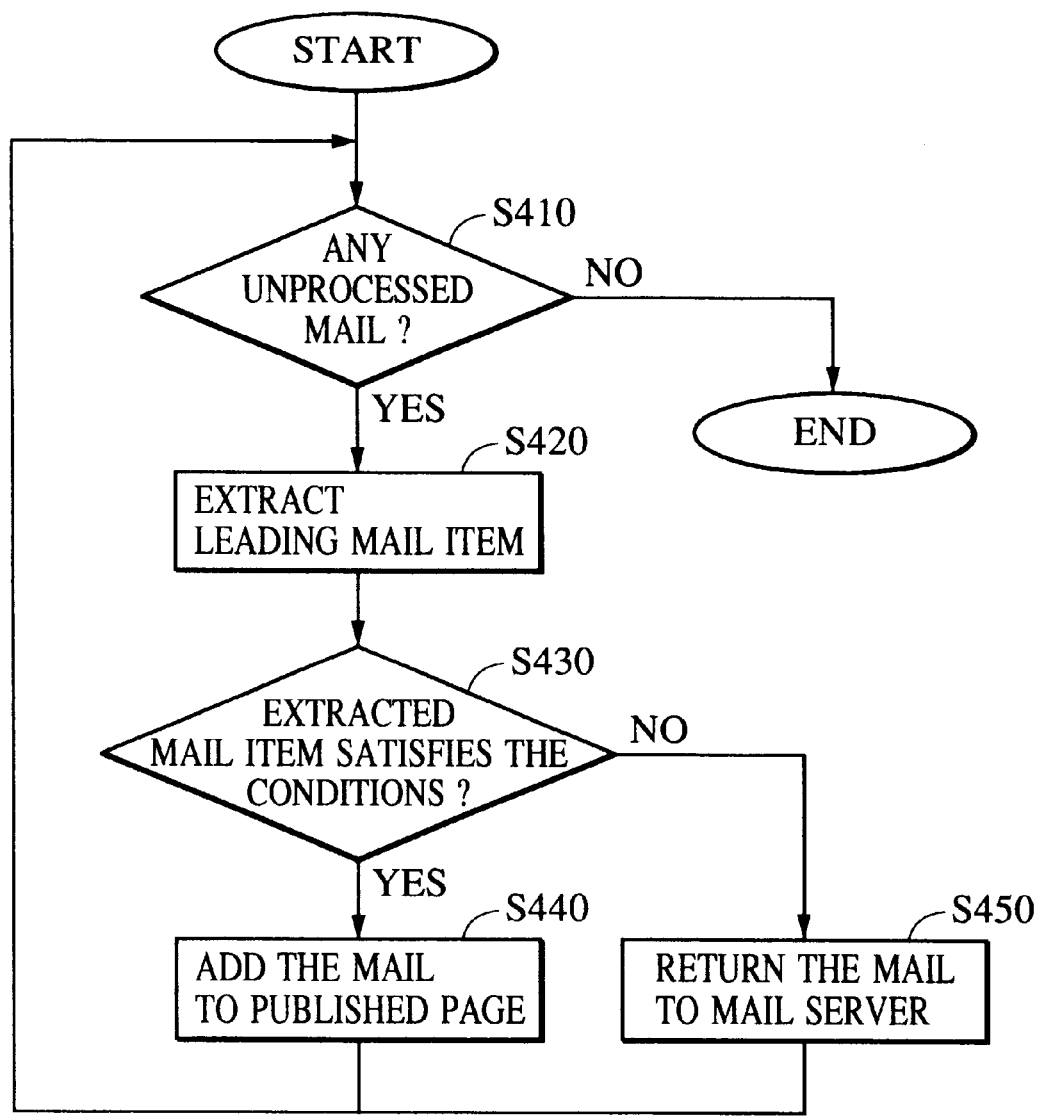
FIG. 6 is a flow chart illustrating the processing executed by the controller according to the first embodiment of the present invention.

FIG. 6 is a flow chart illustrating the processing executed by the controller 110 contained in the publishing server 370. The controller 110 performs the processing illustrated in FIG. 6 at regular intervals. In step S410, the main-information acquiring section 120 makes a query to the mail server 360 about the presence of unprocessed mail. If the answer to the question in step S410 is no, the processing is completed. If it is found that unprocessed mail is present in the mail server 360, the mail-information acquiring section 120 extracts the leading item of unprocessed mail in step S420.

Then, in step S430, the filtering-condition determining section 140 receives the corresponding mail information 380 from the mail-information acquiring section 120 and extracts the filtering conditions managed by the filtering-condition management section 130 so as to determine whether the mail information 380 meets the conditions. In this embodiment, the filtering-condition determining section 140 checks whether the sender and the receiver who have sent and received the mail information 380 are A and B, respectively, and whether the subject field of the electronic mail contains the word "notice". The determining section 140 concludes that the mail information 380 meets the filtering conditions only when all the above conditions are met.

If the answer in step S430 is yes, the processing proceeds to step S440 in which the page generating section 150 converts the corresponding mail information 380 into the format of a published page. The page generating section 150 has skeletons for generating published pages. The skeletons are described in the HyperText Markup Language (HTML) used for describing the published page and including a function for publishing electronic mail.

FIGS. 7 and 8 illustrate examples of such skeletons. In this example, skeletons are divided into a list page (FIG. 7), which displays a list of mail which satisfies the conditions, and a mail-information page (FIG. 8), which displays the individual items of the mail information 380 as individual pages.

In FIGS. 7A through 7C, there are shown respectively a language description 710 for the skeleton of the list page, a language description 720 for the created list page, and an image 730 of the created list page on the display screen. The skeleton language description 710 further has a mail sender field 740, a mail sending-date field 750, a mail subject field 760, and a link information field 770 for the mail information page shown in FIG. 8. In FIGS. 8A through 8C, there are shown respectively a language description 810 for the skeleton of the mail information page, a language description 820 for the created mail information page, and an image 830 of the created mail information page on the display screen. The skeleton description language mail 810 further has a mail sender field 840, a mail sending-date field 850, a mail subject field 860, and a mail body field 870.

The page generating section 150 creates the description language 820 for the page information by using the skeleton language description 810. More specifically, the body field 870 of the skeleton language description 810 is replaced by the body information of the created mail information page, thereby generating the description language 820 for the information page. The generated pages are managed by the page management section 160.

Upon completing the creation of the individual mailing-formation pages, the page generating section 150 creates the description language 720 for the list page having link information for accessing the individual mail-information pages shown in FIG. 8. More specifically, the sender field 740, the sending-date field 750, the subject field 760, the link information field 770, all of which are described in the skeleton description language 710, are replaced by the sender, the sending date, the subject information, and the link information, thereby creating the list-page description language 720.

Referring back to FIG. 6, if it is found in step S430 that the leading mail item does not meet the filtering conditions, the processing proceeds to step S450 in which the mail obtained in step S420 returns to the mail server 360, which will be handled as the mail information processed in the publishing server 370. The processing then returns to step S410 from step S440 or S450.

In order to read the published mail information, the users C and D should make a request to the publishing server 370 by using the published-page reading application. In response to the published-page reading application, the publishing server 370 extracts the published page managed by the page management section 160 and sends the published-page data to the published-page reading application by the page publishing section 170. As a consequence, the users C and D are able to read the published information.

Figure 9:
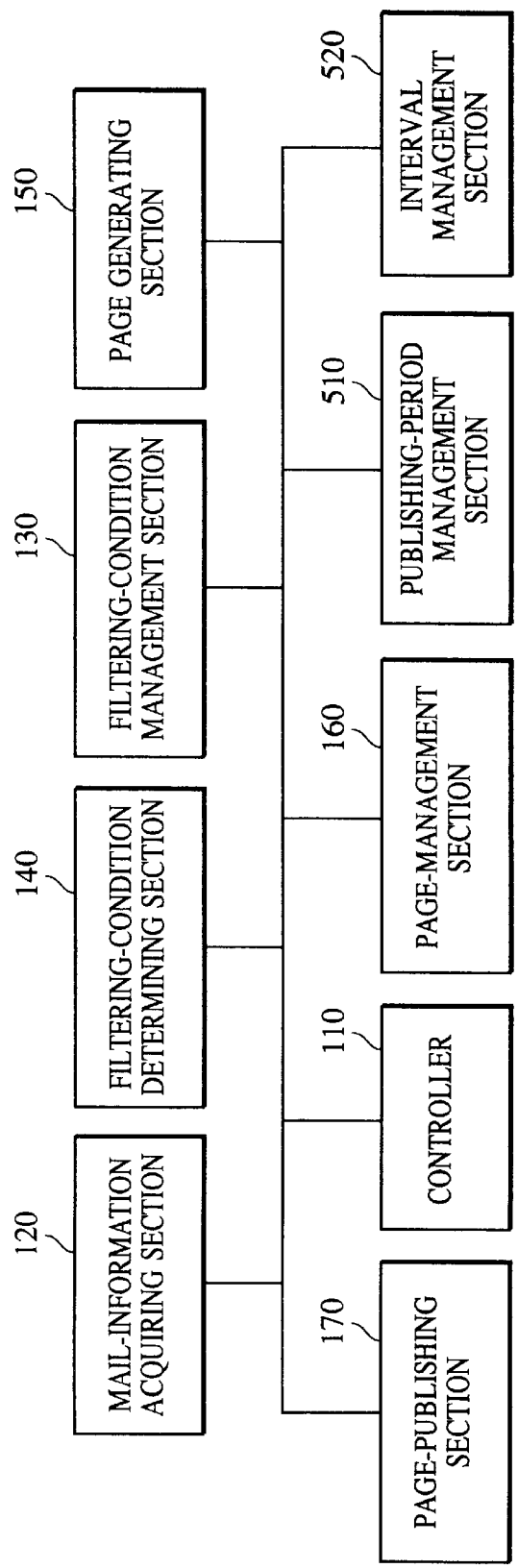
FIG. 9 is a block diagram illustrating the functions of an electronic-mail processing program according to a second embodiment of the present invention.

FIG. 9 is a block diagram illustrating the functions of an electronic-mail processing program according to a second embodiment of the present invention. In this program, the following sections are newly added to the first embodiment shown in FIG. 3: a publishing-period management section 510 for managing the period during which electronic mail is published, and an interval management section 520 for managing time intervals between which it is checked whether there is any electronic mail sent to the mail server 360.

Figure 10:
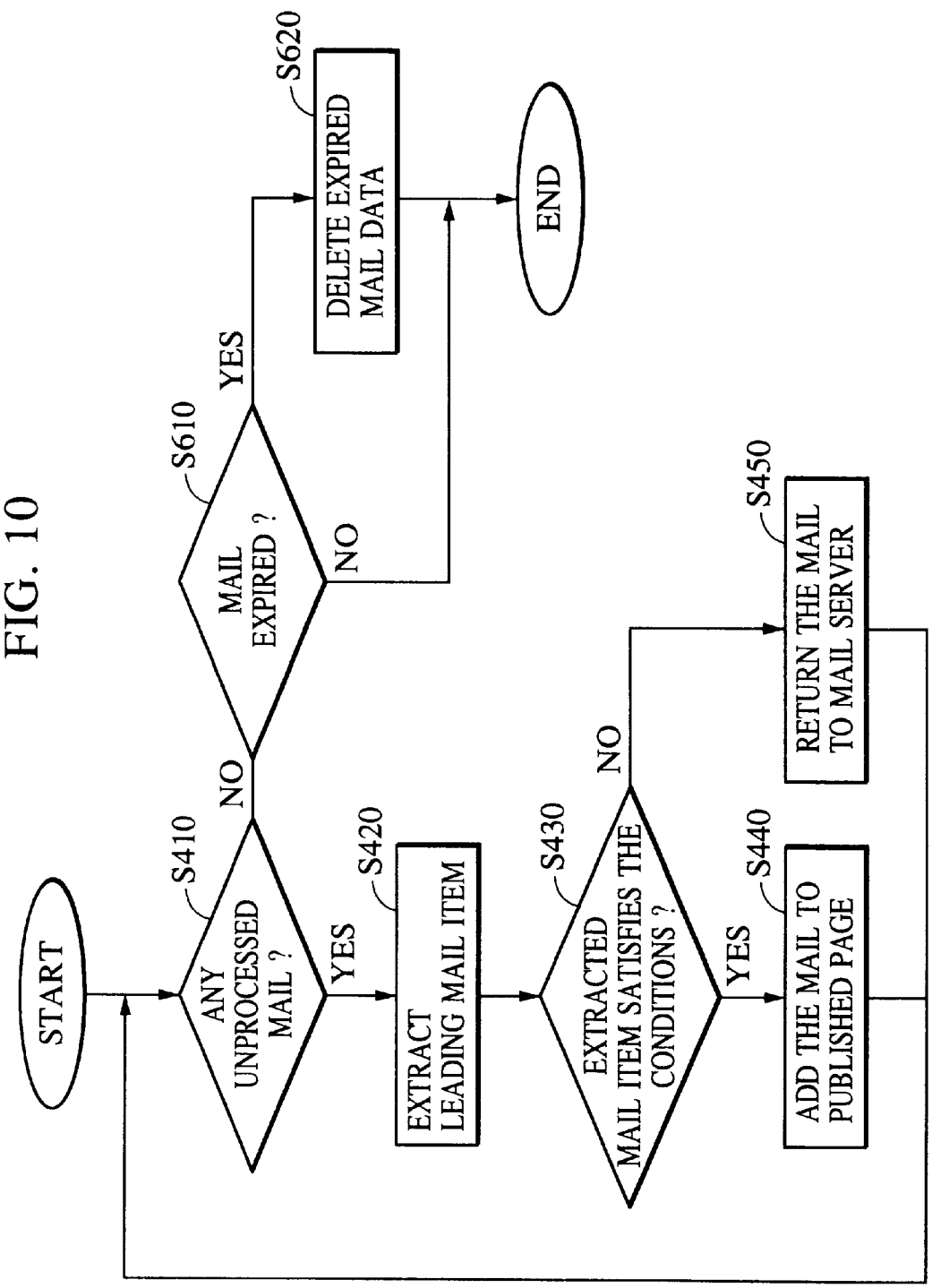
FIG. 10 is a flow chart illustrating the processing performed by the controller according to the second embodiment of the present invention.

FIG. 10 is a flow chart illustrating the processing performed by the controller 110 within the publishing server 370 according to the second embodiment of the present invention. The controller 110 executes the processing shown in FIG. 10 at the intervals managed by the interval management section 520. In this processing, steps S410 through S450 in which all the electronic mail items stored in the mail server 360 are processed are similar to those of the first embodiment, and an explanation thereof will thus be omitted. When it is determined in step S410 that all the mail items have been processed, i.e., when the answer in S410 is no, the processing proceeds to step S610.

In step S610, it is checked whether the electronic mail listed in the electronic-mail published page which is managed by the page management section 160 expires beyond the publishing period managed by the publishing-period management section 510. If the answer to the question of step S610 is yes, the processing proceeds to step S620 in which the expired electronic mail items are deleted, and a new page is generated by the page generating section 150 and is stored in the page management section 160. If the answer to the query of step S610 is no, the processing is completed.

According to the second embodiment, it is possible to delete the expired data as well as to check if there is any electronic mail sent to the publishing server 370.

The electronic-mail processing program according to a third embodiment of the present invention is similar to that of the first embodiment shown in FIG. 3. The information publishing path is also similar to that of the first embodiment illustrated in FIG. 5. Further, the processing procedure is similar to that of the first embodiment illustrated in FIG. 6, except for the step S430 in which it is determined whether the leading mail item satisfies the conditions. Accordingly, only step S430 will be explained in this embodiment.

FIG. 11 illustrates the language specifications which express the filtering conditions used in the third embodiment according to the ABNF description method.

FIG. 12 illustrates an example of the description of the filtering conditions. The filtering conditions determined in this example are that the mail items meeting the following conditions are published in a "notice format" in an area of "notice": "the sender is equal to 'A', or the sender contains the word 'general affairs'", and "the subject contains 'notice'", and "the body does not contain 'internally confidential'".

Figure 13:
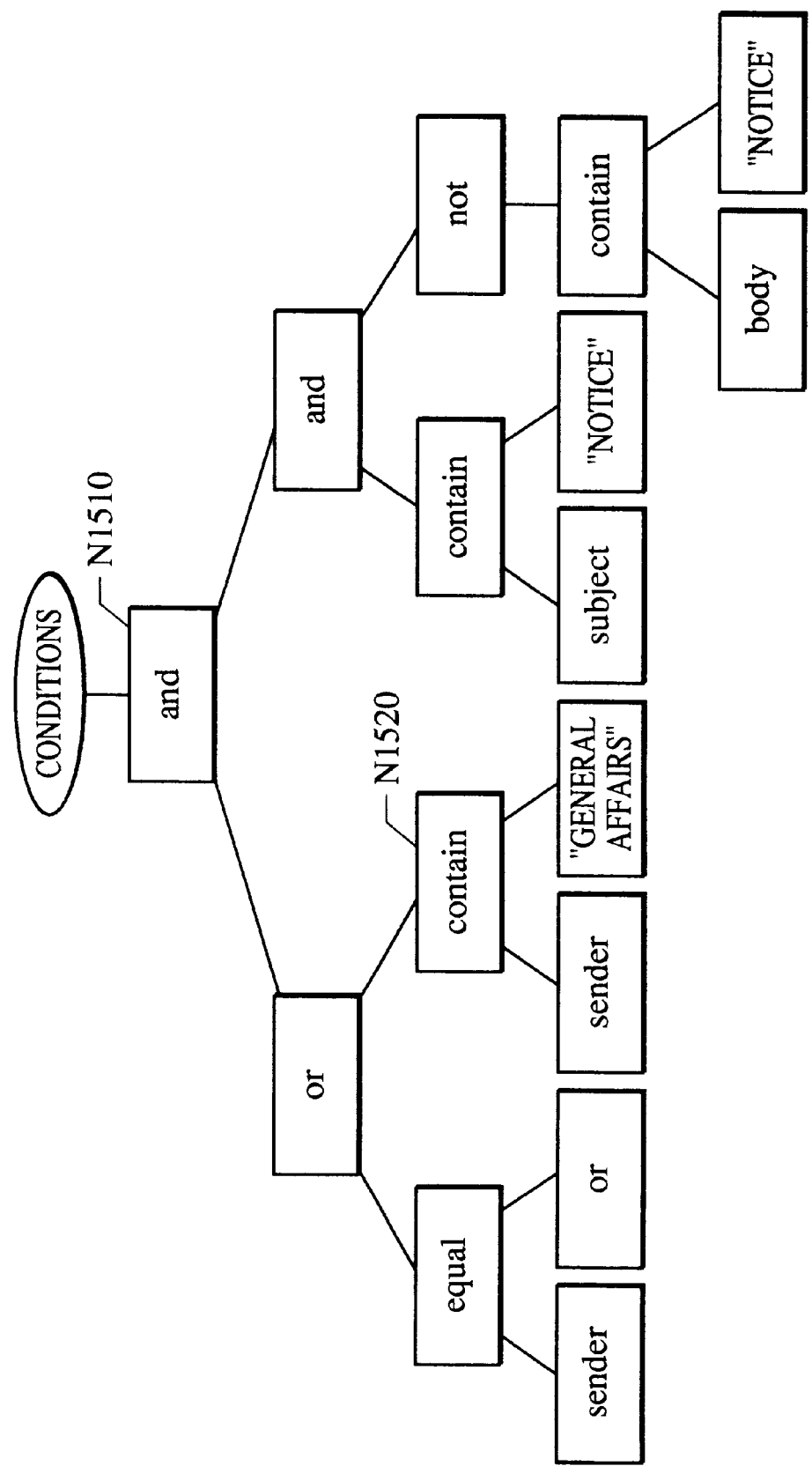
FIG. 13 illustrates a data structure used when the filtering conditions shown in FIG. 12 are specified.

FIG. 13 illustrates the data structure used when the conditions shown in FIG. 12 are specified in the filtering-condition management section 130. FIG. 12 shows that the conditions are expressed by a tree structure.

The filtering-condition determining section 140 determines whether each mail item satisfies the conditions by tracing the nodes of the tree structure. For example, in a node N1510, the condition at the left side of the node is checked. If the value of the condition is true, the condition on the right side of the node N1510 is further checked, and the result on the right side of the node N1510 is determined as the value of the node N1510. If the condition on the left side of the node N1510 is false, the result of the node N1510 is determined to be false. Similarly, in a node N1520, the field value on the left side is obtained from the mail-information acquiring section 120 and is checked whether it contains the field value on the right side of the node N1520. If the answer is yes, the node value is determined to be true, and otherwise, the node value is determined to be false. In this manner, if the value of the node on the top of the tree is yes, it is concluded that the corresponding mail item satisfies the conditions.

Hence, the third embodiment is more advantageous than the first embodiment because electronic-mail extracting conditions can be set more accurately.

It should be noted that the number of terminals which can access the publishing server 370 is not restricted in the foregoing embodiments.

As is seen from the foregoing description, according to the foregoing embodiments, the data to be published which is sent as electronic mail can be published to the publishing server without requiring the user's operation, thereby alleviating effort for publishing electronic mail.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic-mail processing apparatus comprising:
   receiving means for receiving electronic mail from a mail server that sends and receives electronic mail;
   condition setting means for setting a condition used for extracting a publishable electronic mail;
   extracting means for extracting the publishable electronic mail from among the electronic mail received by said receiving means based on the condition set by said condition setting means; and
   publishing means for publishing the publishable electronic mail extracted by said extracting means in a publishing area for publishing to a plurality of users.

2. An electronic-mail processing apparatus according to claim 1, further comprising conversion means for converting the publishable electronic mail extracted by said extracting means into a form suitable for the publishing area, wherein said publishing means publishes the electronic mail converted by said conversion means.

3. An electronic-mail processing apparatus according to claim 1, further comprising returning means for returning to the mail server electronic mail that has not been extracted by said extracting means.

4. An electronic-mail processing apparatus according to claim 1, wherein the condition used for extracting comprises one keyword or a combination of a plurality of keywords.

5. An electronic-mail processing apparatus comprising:
   receiving means for receiving electronic mail from a mail server that sends and receives electronic mail;
   condition setting means for setting a condition used for extracting a specific type of electronic mail;
   extracting means for extracting the specific type of electronic mail from among the electronic mail received by said receiving means based on the condition set by said condition setting means;
   publishing means for publishing the specific type of electronic mail extracted by said extracting means in a publishing area;
   interval setting means for setting a time interval; and
   update means for updating the publishing area at the time interval set by said interval setting means.

6. An electronic-mail processing apparatus comprising:
   receiving means for receiving electronic mail from a mail server that sends and receives electronic mail;
   condition setting means for setting a condition used for extracting a specific type of electronic mail;
   extracting means for extracting the specific type of electronic mail from among the electronic mail received by said receiving means based on the condition set by said condition setting means;
   publishing means for publishing the specific type of electronic mail extracted by said extracting means in a publishing area;
   period setting means for setting a publishing period of electronic mail; and
   deletion means for deleting from the publishing area electronic mail that has expired beyond the publishing period set by said period setting means.

7. An electronic-mail processing system comprising:
   a first terminal;
   a second terminal;
   a first server; and
   a second server, wherein
   said first terminal sends electronic mail addressed to terminals other than said first terminal,
   said first server receives the electronic mail sent from said first terminal,
   said second server receives the electronic mail from said first server and extracts a publishable electronic mail from the received electronic mail based on a condition for extracting the publishable electronic mail and publishes the extracted electronic mail in a publishing area, and
   said second terminal accesses said second server to receive information of the electronic mail published in the publishing area.

8. An electronic-mail processing system according to claim 7, wherein said second server converts the extracted electronic mail into a format suitable for the publishing area and publishes the converted electronic mail.

9. An electronic-mail processing system according to claim 7, wherein said second server returns to said first server electronic mail that has not been extracted.

10. An electronic-mail processing system according to claim 7, wherein the condition for extracting comprises one keyword or a combination of a plurality of keywords.

11. An electronic-mail processing system comprising:
    a first terminal;
    a second terminal;
    a first server; and
    a second server, wherein
    said first terminal sends electronic mail addressed to terminals other than said first terminal,
    said first server receives the electronic mail sent from said first terminal,
    said second server receives the electronic mail from said first server and extracts a specific type of electronic mail from the received electronic mail based on a condition for extracting the specific type of electronic mail and publishes the extracted electronic mail in a publishing area,
    said second terminal accesses said second server to receive information of the electronic mail published in the publishing area; and
    said second server updates the publishing area at a set time interval.

12. An electronic-mail processing system comprising:
    a first terminal;
    a second terminal;
    a first server; and
    a second server, wherein
    said first terminal sends electronic mail addressed to terminals other than said first terminal,
    said first server receives the electronic mail sent from said first terminal,
    said second server receives the electronic mail from said first server and extracts a specific type of electronic mail from the received electronic mail based on a condition for extracting the specific type of electronic mail and publishes the extracted electronic mail in a publishing area, said second terminal accesses said second server to receive information of the electronic mail published in the publishing area; and said second server deletes from the publishing area electronic mail that has expired beyond a publishing period set for the electronic mail.

13. An electronic-mail processing method comprising the steps of:

receiving electronic mail from a mail server that sends and receives electronic mail;

setting a condition used for extracting a publishable electronic mail;

extracting the publishable electronic mail from among the electronic mail received in said receiving step based on the condition set in said setting step; and publishing the publishable electronic mail extracted in said extracting step in a publishing area for publishing to a plurality of users.

14. An electronic-mail processing method according to claim 13, further comprising the step of converting the publishable electronic mail extracted in said extracting step into a form suitable for the publishing area, wherein said publishing step publishes the electronic mail converted in said converting step.

15. An electronic-mail processing method according to claim 13, further comprising the step of returning to the mail server electronic mail that has not been extracted in said extracting step.

16. An electronic-mail processing method according to claim 13, wherein the condition used for extracting comprises one keyword or a combination of a plurality of keywords.

17. An electronic-mail processing method comprising the steps of:

receiving electronic mail from a mail server that sends and receives electronic mail;

setting a condition used for extracting a specific type of electronic mail;

extracting the specific type of electronic mail from among the electronic mail received in said receiving step based on the condition set in said setting step;

publishing the specific type of electronic mail extracted in said extracting step in a publishing area;

setting a time interval; and updating the publishing area at the set time interval.

18. An electronic-mail processing method further comprising the steps of:

receiving electronic mail from a mail server that sends and receives electronic mail;

setting a condition used for extracting a specific type of electronic mail;

extracting the specific type of electronic mail from among the electronic mail received in said receiving step based on the condition set in said setting step;

publishing the specific type of electronic mail extracted in said extracting step in a publishing area;

setting a publishing period of electronic mail; and deleting from the publishing area electronic mail that has expired beyond the set publishing period.

19. A computer-readable memory medium for storing a program for implementing an electronic-mail processing method, the program comprising:

programming code for receiving electronic mail from a mail server that sends and receives electronic mail;

programming code for setting a condition used for extracting a publishable electronic mail;

programming code for extracting the publishable mail from among the received electronic mail based on the set condition; and programming code for publishing the extracted publishable electronic mail in a publishing area for publishing to a plurality of users.

20. A memory medium according to claim 19, the program further comprising programming code for converting the extracted publishable electronic mail into a form suitable for the publishing area, wherein said programming code for publishing publishes the electronic mail converted by said programming code for converting.

21. A memory medium according to claim 19, the program further comprising programming code for returning to the mail server electronic mail that has not been extracted by said programming code for extracting.

22. A memory medium according to claim 19, wherein the condition used for extracting comprises one keyword or a combination of a plurality of keywords.

23. A computer-readable memory medium for storing a program for implementing an electronic-mail processing method, the program comprising:

programming code for receiving electronic mail from a mail server that sends and receives electronic mail;

programming code for setting a condition used for extracting a specific type of electronic mail;

programming code for extracting the specific type of electronic mail from among the received electronic mail based on the set condition; and programming code for publishing the extracted specific type of electronic mail in a publishing area;

programming code for setting a time interval; and programming code for updating the publishing area at the set time interval.

24. A computer-readable memory medium for storing a program for implementing an electronic-mail processing method, the program comprising:

programming code for receiving electronic mail from a mail server that sends and receives electronic mail;

programming code for setting a condition used for extracting a specific type of electronic mail;

programming code for extracting the specific type of electronic mail from the received electronic mail based on the set condition;

programming code for publishing the extracted specific type of electronic mail in a publishing area;

programming code for setting a publishing period of electronic mail; and programming code for deleting from the publishing area electronic mail that has expired beyond the set publishing period.

25. An electronic-mail processing apparatus comprising:

condition setting means for setting a condition used for filtering a publishable electronic mail;

a filter for filtering the publishable electronic mail from a received electronic mail based on the condition set by said condition setting means; and publishing means for publishing the publishable electronic mail filtered by said filter in a publishing area for publishing to a plurality of users.

26. An electronic-mail processing apparatus according to claim 25, further comprising a converter for converting the publishable electronic mail filtered by said filter into a form suitable for the publishing area, wherein said publishing means publishes the electronic mail converted by said converter.

27. An electronic-mail processing apparatus comprising:
condition setting means for setting a condition used for filtering a specific type of electronic mail;
a filter for filtering the specific type of mail from a received electronic mail based on the condition set by said condition setting means;
publishing means for publishing the specific type of electronic mail filtered by said filter in a publishing area;
interval setting means for setting a time interval; and
update means for updating the publishing area at the time interval set by said interval setting means.

28. An electronic-mail processing apparatus comprising:
condition setting means for setting a condition used for filtering a specific type of electronic mail;
a filter for filtering the specific type of electronic mail from a received electronic mail based on the condition set by said condition setting means;
publishing means for publishing the specific type of electronic mail filtered by said filter in a publishing area;
period setting means for setting an electronic-mail publishing period; and
deletion means for deleting from the publishing area electronic mail that has expired beyond the publishing period set by said period setting means.

29. An electronic-mail processing apparatus according to claim 25, wherein the condition used for filtering comprises one keyword or a combination of a plurality of keywords.

30. An electronic-mail processing method comprising the steps of:
setting a condition used for filtering a publishable electronic mail;
filtering the publishable electronic mail from a received electronic mail based on the condition set in said setting step; and
publishing the publishable electronic mail filtered in said filtering step in a publishing area for publishing to a plurality of users.

31. An electronic-mail processing method according to claim 30, further comprising the step of converting the publishable electronic mail filtered in said filtering step into a form suitable for the publishing area, wherein said publishing step publishes the electronic mail converted in said converting step.

32. An electronic-mail processing method comprising the steps of:
setting a condition used for filtering a specific type of electronic mail;
filtering the specific type of electronic mail from a received electronic mail based on the condition set in said setting step;
publishing the specific type of electronic mail filtered in said filtering step in a publishing area;
setting a time interval; and
updating the publishing area at the set time interval.

33. An electronic-mail processing method comprising the steps of:
setting a condition used for filtering a specific type of electronic mail;
filtering the specific type of electronic mail from a received electronic mail based on the condition set in said setting step;
publishing the specific type of electronic mail filtered in said filtering step in a publishing area;
setting an electronic-mail publishing period; and
deleting from the publishing area electronic mail that has expired beyond the set publishing period.

34. An electronic-mail processing method according to claim 30, wherein the condition used for filtering comprises one keyword or a combination of a plurality of keywords.

35. A computer-readable memory medium for storing a program for implementing an electronic-mail processing method, the program comprising:
programming code for setting a condition used for filtering a publishable electronic mail;
programming code for filtering the publishable electronic mail from a received electronic mail based on the set condition; and
programming code for publishing the filtered publishable electronic mail in a publishing area for publishing to a plurality of users.

36. A memory medium according to claim 35, wherein the program further comprises programming code for converting the filtered publishable electronic mail into a form suitable for the publishing area, wherein said programming code for publishing publishes the electronic mail converted by said programming code for converting.

37. A computer-readable memory medium for storing a program for implementing an electronic-mail processing method, the program comprising:
programming code for setting a condition used for filtering a specific type of electronic mail;
programming code for filtering the specific type of electronic mail from a received electronic mail based on the set condition;
programming code for publishing the filtered specific type of electronic mail in a publishing area;
programming code for setting a time interval; and
programming code for updating the publishing area at the set time interval.

38. A computer-readable memory medium for storing a program for implementing an electronic-mail processing method, the program comprising:
programming code for setting a condition used for filtering a specific type of electronic mail;
programming code for filtering the specific type of electronic mail from a received electronic mail based on the set condition; programming code for publishing the filtered specific type of electroinic mail in a publishing area;
programming code for setting a publishing period of electronic mail; and
programming code for deleting from the publishing area electronic mail that has expired beyond the set publishing period.

39. A memory medium according to claim 35, wherein the condition used for filtering comprises one keyword or a combination of a plurality of keywords.

* * * * *

UNITED STATES PATENT AND TRADEMARK OFFICE
CERTIFICATE OF CORRECTION

PATENT NO. : 6,146,026
DATED : November 14, 2000
INVENTOR(S) : Toyohiko Ushiku

Page 1 of 1

It is certified that error appears in the above-identified patent and that said Letters Patent is hereby corrected as shown below:

Title page,
[*] Notice
Insert: -- Notice: This patent issued on a continued prosecution application filed under 37 CFR 1.53 (d), and is subject to the twenty year patent term provisions of 35 U.S.C. 154 (a) (2). --.

Item [56] References Cited
U.S. PATENT DOCUMENTS
Insert: -- 6,044,372   3/2000   Rothfus et al. .......... 707/10 --.
Insert: -- 6,029,195   2/2000   Herz ............... 709/219 --.
Insert: -- 5,999,967   12/1999  Sundsted ........... 709/206 --.
Insert: -- 5,974,410   10/1999  Copeland et al. ....... 707/3 --.
Insert: -- 5,970,491   10/1999  Schreiber et al. ....... 707/10 --.
Insert: -- 5,948,058   9/1999   Kudoh et al. .......... 709/206 --.
Insert: -- 5,530,853   6/1996   Schell et al. .......... 707/1 --.

Column 10,
Line 32, "condition; and" should read -- condition; --.

Signed and Sealed this

Fifth Day of March, 2002

Attest:

Attesting Officer

JAMES E. ROGAN
Director of the United States Patent and Trademark Office